(No Model.)
J. H. WHITING.
TRANSFER TRUCK.
No. 310,008. Patented Dec. 30, 1884.
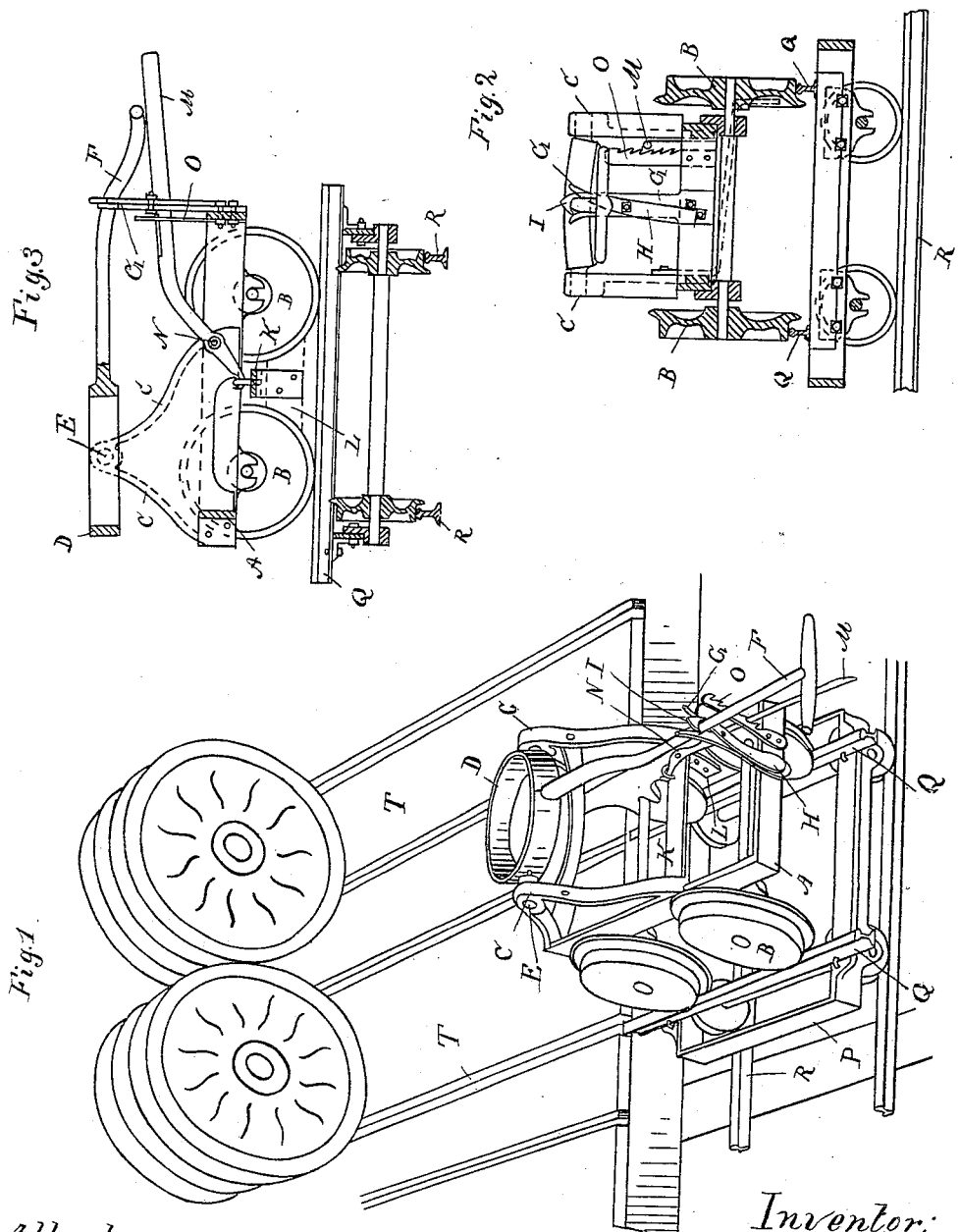
Attest:
John Schumann.
Inventor:
J. Hill Whiting.
by his Atty
Thos. S. Sprague

UNITED STATES PATENT OFFICE.

J. HILL WHITING, OF DETROIT, MICHIGAN.

TRANSFER-TRUCK.

SPECIFICATION forming part of Letters Patent No. 310,008, dated December 30, 1884.

Application filed September 24, 1884. (No model.)

*To all whom it may concern:*

Be it known that I, J. HILL WHITING, of Detroit, in the county of Wayne and State of Michigan, have invented new and useful Improvements in Transfer-Trucks; and I do hereby declare that the following is a full, clear, and exact description thereof, reference being had to the accompanying drawings, which form a part of this specification.

This invention relates to an improvement in trucks for moving car-wheels, principally designed for use in car-wheel foundries.

The invention consists in the novel arrangement and construction of the parts, all as more fully hereinafter set forth.

In the drawings which accompany this specification and form a part thereof, Figure 1 is a perspective view of my truck in connection with suitably-arranged tracks. Fig. 2 is an end view thereof, and Fig. 3 is a vertical central longitudinal section thereof.

A is the frame, and B the wheels, of an ordinary four-wheeled truck designed to run on rails.

C are standards secured upon the truck-frame near one end thereof, and D is a ring-support, provided with trunnions E, by means of which it is supported upon the standards C. The ring D is provided with a handle, F, projecting sufficiently to the rearward of the truck to furnish the operator a convenient hold to push the truck thereby, or allow him to turn the ring D upon its trunnions for the purpose of unloading the car-wheel resting thereon when desired.

G is a standard secured to the rear end of the truck-frame in proper position to have its upper bifurcated end form a support for the handle F.

H is a gravity-dog pivotally secured to the standard G. Its upper end terminates in a hook, I, and it forms a self-locking device for the handle whenever the latter rests upon the support G.

K is a leaf-spring secured at one end to the truck-frame, and extending laterally across the same between the front and rear axles, and having secured to its free end the brake-shoe L.

M is the brake-lever, pivotally secured to the truck-frame at N. Its forward end is hooked onto the leaf-spring, and its rear end is adapted to be engaged with the notched bar O.

P is another four-wheel truck of ordinary construction, having secured to the top of its frame the transverse rails Q, upon which the wheel-truck above described can be placed, and may be readily transferred in a direction at right angles to the one in which it is itself adapted to be moved.

In practice the track R, upon which the truck P is to run, is so arranged as to lead to the crane, by means of which the car-wheels are taken in and out of the cooling-pits. A car-wheel can thus easily be placed by means of that crane upon the ring-support D, so as to lie flat upon it, with its hub projecting within the ring. The transfer-truck P, with the car-wheel truck resting on top of it, and having its brake set so as to prevent its running off, is then pushed along its track until it connects with the desired branch track T, upon which the car-wheel truck is run out after releasing its brake. These branch tracks T of course have to be raised the proper distance above the track R to bring the rails Q in the same plane with the tracks T. When the dog H is released, the car-wheel may be easily dumped into the usual leaning position by means of the handle F. After dumping the car-wheel, the handle F is brought back into its former position, when the dog H will lock it automatically in position again.

The car-wheel truck in present use has a ring-support for supporting the car-wheel upon it; but it cannot be dumped independently of the truck-frame, as it is rigidly connected thereto. It also has but two wheels, so as to make the axle serve as a pivot in dumping, which latter operation requires considerable force and dexterity to accomplish, as the operator has to manipulate the whole truck.

My improved construction admits of the use of a four-wheeled truck, which saves considerable labor in moving when the great weight of a cast-iron car-wheel and the usual condition of foundry-floors are taken in consideration.

The dumping is accomplished without the least difficulty or labor, as the car-wheel is necessarily sufficiently well balanced upon the trunnions of the ring-support, and as the truck cannot during the dumping switch sidewise, as a two-wheeled truck is apt to do, it is much easier for the laborer to arrange the wheels in a symmetrical row, and leaning against each other without the least waste of floor-space.

The object of the brake is to firmly hold the car-wheel truck in position upon its transfer-truck. The brake is set by depressing the lever M and engaging it with the notched bar. If the lever M is again disengaged therefrom, the brake is automatically released by the tension of the leaf-spring.

What I claim as my invention is—

1. In a car-wheel truck, a ring-support provided with trunnions supported by the truck-frame, and having a handle or equivalent device for turning the ring-support upon its trunnions, substantially as described.

2. In a car-wheel truck, a four-wheel truck having a ring-support supported near one end thereof, said ring-support being provided with trunnions and a device—such as a handle—for turning it upon its trunnions, substantially as described.

3. In a car-wheel truck, a ring-support supported upon trunnions by the frame of the truck, and having a handle projecting rearwardly from said ring-support, in combination with suitable devices—such as the forked rest G and dog H—for locking the handle to the truck-frame, substantially as described.

4. In a car-wheel truck, the combination of the following parts: a four-wheeled truck, a ring-support pivotally secured upon trunnions near the front end of the truck, a handle for dumping the ring-support, a locking device for locking the handle to the truck-frame, and a brake provided with a brake-lever projecting in proximity to the handle, all arranged substantially as and for the purposes described.

5. In a car-wheel truck, the combination of the truck-frame, the ring-support pivotally supported upon trunnions, and the handle F, for operating the ring-support, with the self-operating locking device, consisting of the bifurcated rest G and gravity-dog H, all arranged as described.

J. HILL WHITING.

Witnesses:
H. S. SPRAGUE,
E. SCULLY.